United States Patent [19]
Olszewski

[11] Patent Number: 4,468,880
[45] Date of Patent: Sep. 4, 1984

[54] HOOK ATTACHMENT/LINE TIE

[76] Inventor: Daniel P. Olszewski, R3, Box 972, S. Merrit Island, Fla. 32952

[21] Appl. No.: 352,003

[22] Filed: Feb. 24, 1982

Related U.S. Application Data

[63] Continuation of Ser. No. 143,326, Apr. 24, 1980, abandoned.

[51] Int. Cl.³ .............................................. A01K 85/00
[52] U.S. Cl. ................................. 43/42.08; 43/42.09
[58] Field of Search .......................... 43/42.08, 42.09

[56] References Cited

U.S. PATENT DOCUMENTS

| | | | |
|---|---|---|---|
| 1,546,701 | 7/1925 | Bailer | 43/42.08 |
| 2,214,668 | 9/1940 | Erickson | 43/42.08 |
| 2,741,057 | 4/1956 | Morris et al. | 43/42.08 |
| 2,940,204 | 6/1960 | Mehnert | 43/42.08 |
| 2,960,789 | 11/1960 | Paynter | 43/42.08 |
| 3,421,249 | 1/1969 | Jeffers | 43/42.37 |
| 3,546,804 | 12/1970 | Woolums | 43/42.11 |
| 3,698,119 | 10/1972 | Levoin | 43/42.08 |
| 4,095,315 | 6/1978 | McGahee | 24/230 A |
| 4,112,608 | 9/1978 | McGahee | 43/42.09 |

Primary Examiner—Nicholas P. Godici
Assistant Examiner—K. Rowan
Attorney, Agent, or Firm—Harold Gell

[57] ABSTRACT

A wire form shape is presented which may be used in the manufacture of a fishing lure as both a line tie means and a hook attachment means. The wire form includes a 270° loop at one end which cooperates with assembly locating pins within a fishing lure body and a 180° loop near the other end of the wire which forms a means to suspend hooks or tie a line.

4 Claims, 2 Drawing Figures

HOOK ATTACHMENT/LINE TIE

This is a continuation of application Ser. No. 143,326, filed 4-24-80 now abandoned.

TECHNICAL FIELD

This invention relates to fishing lure hardware for securing fishing hooks to lure bodies and providing a means whereby a line or leader may be secured to the lure.

BACKGROUND OF PRIOR ART

Numerous means are used to secure fishing hooks to fishing lure bodies and provide attachment points for leaders. One common method of providing both a means to secure fishing hooks and tie leaders to the lures is the use of screw eyes. Screw eyes require a manual assembly operation which increases the cost of fishing lures and their security degraded with use in that twisting actions exerted on hooks and leader attaching points tend to lessen the holding ability of the screw threads which ultimately leads to failure of the attaching means.

Lure approaches to securing hooks and leader attaching means to fishing lures include the use of metal straps which are secured to a lure body by rivets or screws. The metal straps are expensive in that they require a manual operation for installation and the rivets or screw threads are subject to deteriorating wear as the lure is used which ultimately results in failure of the connection system.

These various shortcomings in lure hardware have been partially overcome through the use of hook hangers such as described in the McGahee U.S. Pat. Nos. 4,095,315 and 4,112,608 which are directed to a hook attachment system. However, this improvement in the art does not extend to the leader or line connecting system and necessitates that the manufacturer maintain an inventory of a number of different types of lure hardware.

A further shortcoming in fishing lure hardware is created because of variations in balance of production fishing lures which necessitate that fishermen tune individual lures for proper action by bending the line attachment means to one side or the other. When this is done to present design line attachment hardware, the hardware does not retain the new, altered position because the act of bending the hardware loosens the hardware and in some cases damages the lure material around the hardware. This ultimately results in lost tuning and in some instances lost lures and fish when a strike occurs and the damaged lure material permits the hardware to be pulled out.

OBJECTIVES OF THE INVENTION

Therefore, it is a primary objective of the present invention to provide fishing lure hardware which may be used as both a hook hanging means and a line attaching means.

A further objective of the invention is to provide a line attaching means wherein the attachment point is supported by two wires which enter the lure body with lure material separating their points of entry to create a double strut which will allow a fisherman to tune the lure by bending the double strut but will prevent rotational forces from being applied to the lure material.

A still further objective of the present invention is to provide a wire shape which may be used in the manufacture of a fishing lure to provide a hook attachment means such as suggested in U.S. Pat. Nos. 4,095,315 and 4,112,608 and also serve as a line connection means.

A further objective of the invention is to provide fishing lure hardware having a common design but capable of fulfilling a plurality of purposes.

A still further objective of the present invention is to provide an economical means to attach hooks and leaders to fishing lures.

SUMMARY OF THE INVENTION

This invention presents a fishing lure hardware concept wherein one wire form shape may be used to create hook attachment means such as taught in U.S. Pat. Nos. 4,095,315 or 4,112,608 and provide a line tie means having increased reliability and tuning capability.

The wire form shape includes a loop at one end forming a circle of approximately 270° which encircles locating pins utilized in the assembly of lure bodies or provides a means whereby the wire form is more securely retained within the lure body if the lure body is manufactured with a molding process. An off set 180° loop is provided near the other end of the wire form. This loop has the other end of the wire extending therefrom so that the wire form may be embedded in a lure body with both ends of the wire secured by lure material and the 180° loop exposed to create a line tie means or the straight end of the wire form coming off of the 180° loop may be positioned in the hook hanger cup of the hook attachment system as described in U.S. Pat. No. 4,095,315 to create a hook hanger.

DESCRIPTION OF THE INVENTION

Figure 1:
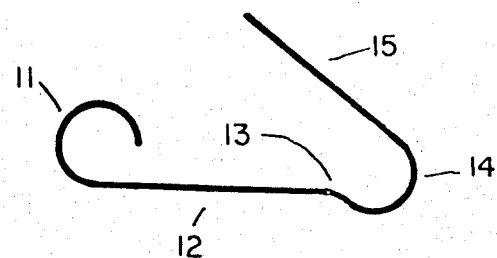
FIG. 1 illustrates the hook hanger/line tie means of the present invention.

The hook hanger/line tie means of the present invention is illustrated in FIG. 1. The form may be made from a wide variety of wire like material having a spring resiliency and a diameter calculated to meet design load requirements. The form includes a 270° loop 11 formed in one end with a straight body section 12 having an off set creating an open angle of greater than 90°. After the off set 13, the wire material is formed in a 180° loop 14 with a further length of wire 15 extending from the loop.

Figure 2:
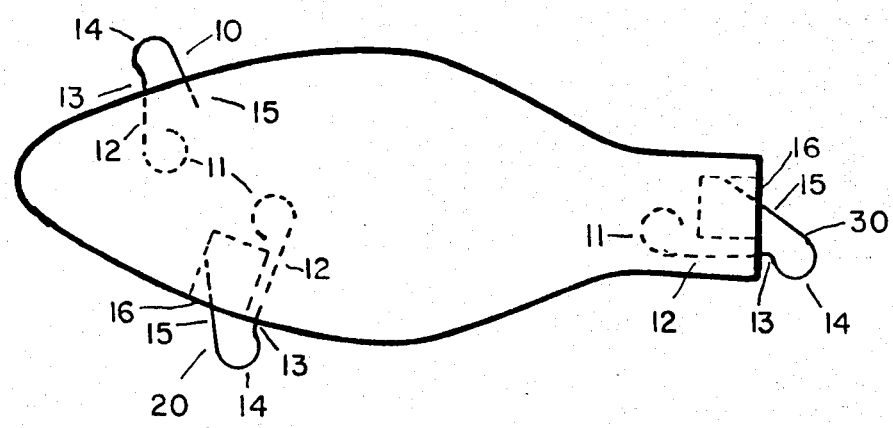
FIG. 2 illustrates the hook hanger/line tie means incorporated in a fishing lure body.

In FIG. 2 a typical hook hanger 10 is embedded in a lure body to form a line tie. Note that the 270° loop 11 and straight segment 12 are completely embedded within the lure body as is the straight segment 15 so that the 180° loop 14 will project in a forward direction from the lure body and provide a means whereby a line or leader may be tied.

To create a hook hanger, the 270° curved section 11 of wire forms 20 and 30 as well as the straight segments 12 are embedded in the lure body material so that the 180° loop 14 will extend from the lure body to create a hook hanger and the straight end of the form of 15 will enter a preformed cup 16 in the lure body to create a hook hanger attachment such as taught in U.S. Pat. Nos. 4,095,315 or 4,112,608.

In a preferred embodiment, the 270° loop 11 is dimensioned to fit about lure assembly locating pins in a fashion similar to that described in the copending patent application Ser. No. 142,868 on "Fishing Lure And Method Of Fabrication" filed by the same inventor as the present application. In this application of the wire form, the loop is dimensioned so that it will snugly fit about the locating pins.

In alternate uses of the wire form wherein locating pins are not used and the wire is embedded in lure material, the dimensions of the 270° curved end 11 are less critical but the radius should be approximately equal to the radius required of the 180° loop 14 to ensure adequate security within the lure body for the calculated stress which will be placed upon loop 14 during use of the hardware.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A fishing lure with a hook hanger/line tie apparatus, comprising:
  a formed wire including:
  a first straight segment (12) of said wire;
  a first loop (11) formed in said wire at one end of said first straight segment wherein said first loop describes an arc of at least 180°, said first loop forming a first end termination of said formed wire;
  a bend (13) of less than 90° in said wire at the end opposite said first loop and in a direction opposite said first loop, creating an open angle greater than 90° between said first straight segment and the remaining wire after said bend;
  a second loop (14) in said wire forming a semi-circle of 180° plus or minus 45°, said second loop formed after said bend and curved in a direction opposite the curve of said bend;
  a second straight, segment (15) of wire at the open end of said second loop, said second straight segment of wire forming a second end termination of said formed wire; and
  a fishing lure body including an internal channel means identical in size and shape to said first straight line segment and said first loop for embedding and rigidly securing in said body said first straight segment and said first loop of said formed wire in an orientation such that said second loop and a portion of said second straight end segment of said formed wire is held external to said body.

2. An apparatus as defined in claim 1 wherein said first loop encompasses 270° and said second loop encompasses 180°.

3. A fishing lure with hook hanger/line tie apparatus as defined in claim 1 wherein the extreme end portion of said second straight end segment of said formed wire is secured and held within said body.

4. A fishing lure and hook hanger/line tie apparatus as defined in claim 1 wherein said fishing lure body includes a plurality of said internal channel means and said apparatus includes a number of formed wires equal to said plurality of internal channel means.

* * * * *